Patented May 23, 1944

2,349,598

UNITED STATES PATENT OFFICE 2,349,598

PROCESS FOR PURIFICATION OF MERCAPTOTHIAZOLES

Harold P. Roberts, Tallmadge, Ohio, assignor to Wingfoot Corporation, Akron, Ohio, a corporation of Delaware No Drawing. Application November 12, 1941, Serial No. 418,794

7 Claims. (Cl. 260—306)

This invention relates to the purification of 2-mercapto-arylene-thiazoles. More particularly, it relates to the purification of 2-mercapto-arylene-thiazoles by treating the impure 2-mercapto-arylene-thiazole with an oxide or hydroxide of an alkaline earth metal, such as calcium, to produce an aqueous solution of the alkaline earth metal salt of the 2-mercapto-arylene-thiazole, separating this solution from the insoluble impurities and then treating the solution with an acid to reprecipitate the free 2-mercapto-arylene-thiazole in purified form.

A number of methods for purifying 2-mercapto-arylene-thiazoles are known and, of course, each of the various methods possesses its own characteristics. As a general proposition, the purity obtainable with a given number of treatments varies with each process. Some of the processes which yield products of the highest purity are rather expensive. The present invention has the advantage of producing a high purity 2-mercapto-arylene-thiazole at a reasonable cost.

A large proportion of the 2-mercapto-arylene-thiazoles produced commercially are purified by dissolving the crude product in sodium hydroxide, separating the solution of the sodium salt from the insoluble impurities and precipitating the free 2-mercapto-arylene-thiazole by means of an acid. This process is economical and for many purposes is satisfactory but it has certain disadvantages. For example, the process is rather sensitive and the concentration and amount of sodium hydroxide employed must be carefully adjusted in order to obtain good results. Moreover, in order to obtain best results so far as purity is concerned, a very limited amount of caustic must be employed with the result that the process becomes inefficient and a large amount of free 2-mercapto-arylene-thiazole is lost with the insoluble impurities or must be re-worked. Also, in order to obtain satisfactory results, the caustic solution must be dilute and this entails the use of large volumes of water with the resultant necessity of having oversized equipment. Furthermore, while the purity obtainable is satisfactory for some purposes, for other purposes a higher purity is required.

It has now been found that crude 2-mercapto-arylene-thiazoles may be treated with a slurry of lime, whereupon the 2-mercapto-arylene-thiazole is converted into its calcium salt and goes into solution. Because of the limited solubility of the lime and its relatively low alkalinity, the proportions of 2-mercapto-arylene thiazole and lime do not have to be carefully controlled and it is not necessary to use excessive amounts of water to keep the solution dilute as is the case when sodium hydroxide is used. The extraction of the mercaptothiazole is highly selective and the undesirable impurities are separated with a high degree of efficiency. The lime also possesses the advantage that it is a very cheap material and is available in large quantities. The result is that, by using lime to extract the 2-mercapto-arylene-thiazole from the unwanted impurities, it is possible to secure a product of high purity with relative ease and a minimum of control and skill, all at a reasonable cost.

The lime may be used in various forms. Thus it may be either calcium oxide or calcium hydroxide. Also, it need not be chemically pure; technical grades are satisfactory for most purposes.

In practice it is desirable to use an excess of lime over the amount required to dissolve the 2-mercapto-arylene-thiazole. This ensures relatively complete extraction of the 2-mercapto-arylene-thiazole. The lime is prepared in the form of a slurry, which is preferably heated to a temperature of about 40-45° C. in order to facilitate the solution of the 2-mercapto-arylene-thiazole and to increase the solubility of its calcium salt. The crude 2-mercapto-arylene-thiazole is mixed with the aqueous slurry of lime, the mixture is stirred until the 2-mercapto-arylene-thiazole has gone into solution. The insoluble impurities together with excess lime are then removed by any convenient means. It is satisfactory and convenient to allow the solution to stand until the insoluble material settles out and then to decant off the solution of the calcium salt of the 2-mercapto-arylene-thiazole and this constitutes a preferred method of separation. However, filtration and other methods may also be employed. After separation from the insoluble matter, the solution of the calcium salt of the 2-mercapto-arylene-thiazole is treated with at least an equivalent amount of acid to re-precipitate the free 2-mercapto-arylene-thiazole. Any water-soluble acid strong enough to precipitate the free 2-mercapto-arylene-thiazole may be used. From the practical standpoint, hydrochloric acid and sulfuric acid are preferred materials.

The merit of the process is demonstrated by the fact that a crude 2-mercaptobenzothiazole having a purity of about 90-91% can be treated with a slurry of lime, decanted from the insoluble impurities and excess lime and reprecipitated with hydrochloric acid to produce, by one such purification treatment, a product having a purity of 98-99%. This figure may be compared with a figure of about 95½%, which is indicative of the best purities obtainable under comparable conditions by the use of sodium hydroxide over a long period of years and with all of the refinements of control and skillful operation developed during that period.

When sulfuric acid is used as the precipitant there is precipitated along with the free 2-mercapto-arylene-thiazole an equivalent amount of calcium sulfate. This material is not detrimental for many purposes and, when the 2-mercapto-arylene-thiazole is used as an accelerator of the vulcanization of rubber, the calcium sulfate will act as a harmless filler. In fact, with the small amounts of 2-mercapto-arylene-thiazole employed in the rubber mix the amount of calcium sulfate introduced in this manner is generally negligible. The products prepared according to the process of the invention have been tested as accelerators of the vulcanization of rubber and handle well and give very satisfactory cures.

The process may be employed with 2-mercapto-arylene-thiazoles prepared by various methods. One of the most widely used methods for preparing such compounds is that described in U. S. Patent No. 1,631,871, according to which sulfur, carbon bisulfide and a primary aromatic amine having a free ortho position are reacted. The present invention is particularly applicable to the purification of 2-mercapto-arylene-thiazoles prepared by this method. Analogous products containing similar impurities are obtained from other processes such as those described in U. S. Patent No. 1,891,198 which employs dianilinomethane, sulfur and carbon bisulfide; U. S. Patent No. 2,070,522 which employs formanilide and sulfur, with or without carbon bisulfide; U. S. Patent No. 1,906,112 which employs thiocarbanilide, carbon bisulfide and sulfur dichloride; U. S. Patent No. 1,858,344 which employs anilinobenzothiazole and sulfur; U. S. Patent No. 1,753,878 which employs phenyl mustard oil and sulfur; U. S. Patent No. 1,712,968 which employs diphenylthiourea, carbon bisulfide and sulfur; U. S. Patent No. 1,972,963 which employs anhydroformaldehyde-aniline and sulfur; U. S. Patent No. 1,865,477 which employs o,o'-diaminodiphenylsulfide and carbon bisulfide; U. S. Patent No. 2,123,841 which employs aniline sulfite, aniline and carbon bisulfide; and U. S. Patent No. 2,001,587 which employs aniline, nitrobenzene and carbon bisulfide. The reactants specified in each of these examples produce 2-mercaptobenzothiazole; other 2-mercapto-arylene-thiazoles may be prepared by selection of appropriate analogous starting materials.

All of these methods are related in that the conditions of reaction are quite similar. Each is carried out at a temperature of about 150–300° C. and thus produces the 2-mercapto-arylene-thiazole in molten form. In practice, the molten product may be discharged directly into the slurry of lime, preferably with stirring. Alternatively, the molten product may be cooled, broken up into lumps and mixed with the lime. Also, the crude product may first be converted into pellets by pouring the molten material into water, with stirring and preferably with the water at a temperature of about 50–90° C., or, if desired, the product may first be treated with dilute acid according to the process set forth in U. S. Patent No. 2,117,120. Discharging the molten product into water or, preferably, dilute acid effects some purification and gives a final product of improved purity when used in conjunction with the present invention.

If desired, the lime of the foregoing description may be replaced with the oxide or hydroxide of other alkaline earth metals with more or less efficacious results. Thus, barium and strontium hydroxides may also be used. However, the calcium compounds are readily and cheaply available and are preferred from both the economical and functional standpoints.

What I claim is:

1. A method of purifying a 2-mercaptoarylenethiazole which comprises treating an aqueous slurry of the same with an excess of lime to produce an aqueous solution of the calcium salt of the 2-mercaptoarylenethiazole, separating this solution from the insoluble impurities and excess lime and then treating the solution with an acid to reform the 2-mercaptoarylenethiazole.

2. A method of purifying a 2-mercaptoarylenethiazole which comprises treating an aqueous slurry of the same with an excess of lime to produce an aqueous solution of the calcium salt of the 2-mercaptoarylenethiazole, separating this solution from the insoluble impurities and excess lime and then treating the solution with hydrochloric acid to reform the 2-mercaptoarylenethiazole.

3. A method of purifying a 2-mercaptoarylenethiazole which comprises treating an aqueous slurry of the same with an excess of lime to produce an aqueous solution of the calcium salt of the 2-mercaptoarylenethiazole, separating the solution from the insoluble impurities and excess lime and then treating the solution with sulfuric acid to reform the 2-mercaptoarylenethiazole.

4. A method of purifying a 2-mercaptoarylenethiazole which comprises treating an aqueous slurry of the same with an excess of lime in the form of a hot slurry to produce an aqueous solution of the calcium salt of the 2-mercaptoarylenethiazole, separating this solution from the insoluble impurities and excess lime and then treating the solution with a strong inorganic acid to reform the 2-mercaptoarylenethiazole.

5. A method of purifying a 2-mercaptoarylenethiazole which comprises treating an aqueous slurry of the same with an excess of lime to produce an aqueous solution of the calcium salt of the 2-mercaptoarylenethiazole, decanting this solution from the insoluble impurities and excess lime and then treating the solution with an acid to reform the 2-mercaptoarylenethiazole.

6. A method of purifying a 2-mercaptobenzothiazole which comprises treating an aqueous slurry of the same with an excess of lime to produce an aqueous solution of the calcium salt of the 2-mercaptobenzothiazole, separating this solution from the insoluble impurities and excess lime and then treating the solution with an acid selected from the group consisting of hydrochloric and sulfuric acids to reform the 2-mercaptobenzothiazole.

7. A method of purifying a 2-mercaptoarylenethiazole which comprises treating the same to produce an aqueous solution of an alkaline earth salt of the 2-mercaptoarylenethiazole, separating this solution from the insoluble impurities and then treating the solution with an acid to reform the 2-mercaptoarylenethiazole.

HAROLD P. ROBERTS.